UNITED STATES PATENT OFFICE.

HEINRICH THRON, OF FRANKFORT-ON-THE-MAIN, GERMANY, ASSIGNOR TO VEREINIGTE CHININFABRIKEN ZIMMER & CO., G. M. B. H., OF FRANKFORT, GERMANY, A SOCIETY ORGANIZED UNDER THE LAWS OF GERMANY.

PROCESS OF HYDROGENIZING ORGANIC COMPOUNDS.

1,077,442.  Specification of Letters Patent.  Patented Nov. 4, 1913.

No Drawing.   Application filed April 30, 1913.   Serial No. 764,641.

*To all whom it may concern:*

Be it known that I, HEINRICH THRON, a subject of the Emperor of Germany, residing at Frankfort-on-the-Main, Germany, have invented certain new and useful Improvements in the Process of Hydrogenizing Organic Compounds, of which the following is a specification.

My invention relates to improvements in the process of hydrogenizing organic compounds.

Recently various products have been produced by combining hydrogen with organic compounds by means of finely divided platinum metals. This is done by shaking the compounds which are subjected to the process together with a finely divided metal of the platinum group or colloidal solutions of the said metals and hydrogen, until the required amount of the hydrogen has been taken up by the substance. I have discovered, that the shaking with hydrogen and the apparatus necessary for that may be avoided by treating the said substances with a finely divided metal of the platinum group and formic acid. The latter is split by the platinum metals by catalytical action into carbonic acid and hydrogen, the latter causing the formation of a compound of the platinum metal and hydrogen (hydrid of the platinum metal). By adding to the substances to be hydrogenized formic acid and, for example, palladium black, the development of carbonic acid begins at once, while hydrogen is combined with the substances from which the process is started. Thereby hydro-derivates are formed in the most simple way.

Example 1: To 20 parts of quinin bisulfate 100 parts of 2 per cent. formic acid and 0.4 parts of palladium black are added. The development of carbonic acid begins at once. When it is finished, the liquid which is not found to be stable toward potassium permanganate is filtered off from the palladium and neutralized under heat with ammonia after diluting the same with water. After cooling hydroquininsulfate is crystallized out.

Example 2: To a solution of 1 part of colloidal palladium in 250 parts of 2 per cent. formic acid 30 parts of quinin-bisulfate are added. After a short time the development of carbonic acid begins. While frequently shaking the same the solution is allowed to stand, until the development of gas is finished, and a test portion is nearly stable toward potassium permanganate in sulfuric acid solution. Thereupon the base is separated by means of soda lye and taken up in ether. When the concentrated etheric solution is allowed to stand, hydroquinin is crystallized out.

Example 3: To 10 parts of cinnamic acid ($C_6H_5.CH-CH.COOH$) 30 parts of alcohol, and 4 parts of formic acid, palladium black is added which is made by the process described by Wieland, from 0.5 parts of palladium chlorid ($PdCl_2$). The mixture is allowed to stand at first at the temperature of the room, and thereafter at a temperature of from 50 to 60 degrees centigrade, until the development of carbonic acid is finished. Thereupon the liquid is filtered off from the palladium, water is added and the alcohol is distilled off. The hydrocinnamic acid which was separated in oily form is crystallized from benzin.

I claim:—

1. The hereindescribed process of hydrogenizing organic compounds, which consists in treating the substance to be hydrogenized with formic acid and a finely divided metal of the platinum group.

2. The hereindescribed process of hydrogenizing organic compounds, which consists in treating the substance to be hydrogenized with formic acid and a colloidal solution of a metal of the platinum group.

In testimony whereof I have signed my name to this specification in the presence of two subscribing witnesses.

HEINRICH THRON.

Witnesses:
 JEAN GRUND,
 CARL GRUND.